United States Patent Office 3,564,053
Patented Feb. 16, 1971

3,564,053
PRODUCTION OF β-CHLOROALKYL OF
β - BROMOALKYL SULFOCHLORIDES
OR SULFOBROMIDES
Harry Distler, Ludwigshafen (Rhine), Germany, assignor to Badische Anilin- & Soda-Fabrik Aktiengesellschaft, Ludwigshafen (Rhine), Germany
No Drawing. Filed Sept. 12, 1967, Ser. No. 667,096
Claims priority, application Germany, Sept. 20, 1966,
P 12 51 748.5
Int. Cl. C07c *143/70*
U.S. Cl. 260—543　　　　　　　　　　6 Claims

ABSTRACT OF THE DISCLOSURE

Production of β-chloroethyl, β-bromoethyl, β-chloropropyl or β-bromopropyl sulfochlorides or sulfobromides by the reaction of β-hydroxyethylmercaptan or β-hydroxypropylmercaptan at temperatures of −15° C. to +50° C. ratio of 1:3 to 1:6 in the presence of 1 to 1.1 moles of water per mole of β-hydroxyethylmercaptan or β-hydroxypropylmercaptan at temperatures of −15° C. to +50° C. It is possible to use inert solvents in the reaction. The products are suitable for the production of polyvinylsulfonic acid which can be used as catalyst in hydrolytic reactions.

---

The object of the invention is to provide a process for the production of β-chloroalkyl sulfochlorides, β-chloroalkyl sulfobromides, β-bromoalkyl sulfochlorides and β-bromoalkyl sulfobromides from β-hydroxyalkylmercaptans.

It is known from the Journal of Organic Chemistry, volume 23 (1958) page 478, and U.K. patent specification No. 964,235 that β-chloroethyl sulfochloride is obtained by reacting ethyl chloride with sulfur dioxide and chlorine using light. This method has the disadvantage that up to 60% of more highly chlorinated ethane is obtained, the yield thus being very greatly diminished. It is also known from German patent specification No. 907,775 that β-chloroethyl sulfochloride can be prepared by reacting ethyl sulfochloride with chlorine. Dichloroethyl and trichloroethyl sulfochlorides readily form however and can only be separated at great expense. Another method, which is described in Beilsteins Handbuch der organischen Chemie (1922), volume 4, page 7, is based on the reaction of sodium β-hydroxyethylsulfonate with phosphorus pentachloride. This method has not found entry into industry however because phosphorus pentachloride is an expensive reagent. Moreover it is stated in Doklady Akad. S.S.R., volume 157/1 (1964), pages 139 to 142, that β-chloroethyl sulfochloride is obtained by reaction of ethylene with sulfuryl chloride in the presence of aluminum chloride. The yield of β-chloroethyl sulfochloride is however only 11% of the theory.

It is an object of this invention to provide a process according to which β-chloroalkyl and β-bromoalkyl sulfochlorides or sulfobromides are obtained in a pure form without appreciable secondary reactions. It is a further object of the invention to provide a process according to which β-chloroalkyl and β-bromoalkyl sulfochlorides or sulfobromides are obtained in excellent yields.

In accordance with this invention these and other objects and advantages are achieved by reacting β-hydroxyethylmercaptan or β-hydroxypropylmercaptan with chlorine or bromine in a molar ratio of 1:3 to 1:6 in the presence of 1 to 1.1 moles of water per mole of β-hydroxyethylmercaptan or β - hydroxypropylmercaptan at temperatures of from −15° C. to +50° C.

The new process has the advantage that β-chloroalkyl and β-bromoalkyl sulfochlorides or sulfobromides are obtained direct in pure form in excellent yields without appreciable secondary reactions. The process is remarkable in that no intermolecular esterification of primarily formed β-hydroxyalkylsulfochlorides or β - hydroxyalkylsulfobromides takes place. Furthermore the hydroxyl groups in the β-hydroxyalkylmercaptans are not oxidized to carbonyl groups (as was to be expected) by treatment with chlorine or bromine.

It is preferred to use β-hydroxyethylmercaptan and α-hydroxypropylmercaptan for the reaction. In general 3 to 6 moles, particularly 3 to 4 moles, of chlorine or bromine, is used for each mole of β-hydroxyalkylmercaptan.

The reaction is carried out in the presence of water. In general 1 mole of water is used for 1 mole of the β-hydroxyalkylmercaptan. To complete the reaction, water may be added in a slight excess, for example up to 10 mole percent, to the reaction mixture. The water may be added all at once, for example at the start. It is advantageous however to add it in portions during the reaction or continuously at the rate at which it is used up.

The reaction proceeds at temperatures of from −15° C. to +50° C. It is preferred to use temperatures of from 0° to 25° C.

In general it is not necessary to use solvents. Solvents which have a boiling point of from 30° to 200° C. and which are inert under the reaction conditions may however be used. Examples of suitable solvents are hydrocarbons, such as cyclohexane or benzene; or chlorohydrocarbons, such as dichloroethane chlorides, carbon tetrachloride or chlorobenzene.

The process according to the invention may be carried out for example by placing a β-hydroxyalkylmercaptan with the specified amount of water in a reactor and metering in chlorine or bromine in the specified ratio at the specified temperature, chlorine being advantageously passed as a gas into the reaction mixture. In a preferred embodiment, the water is added to the reaction mixture in portions or continuously at the rate at which it is being used up. The resultant β-chloroalkyl or β-bromoalkyl sulfochlorides or sulfobromides are purified by vacuum distillation after the solvent and the excess water have been separated. The purity of the reaction products obtained is adequate for industrial purposes.

The β-chloroalkyl or β-bromoalkyl sulfochlorides or sulfobromides prepared according to the process are suitable for the production of vinylsulfonic acid derivatives and polymers of the same (cf. Houben-Weyl, Methoden der Organischen Chemie, Georg Thieme Verlag Stuttgart, 1961, volume 14/1, pages 1097 et seq.

The invention is illustrated by the following examples in which parts are by weight.

EXAMPLE 1

166 parts of β-hydroxyethylmercaptan (technical, 94.5%) and 300 parts of 1,2-dichloroethane are placed in a stirred vessel. 455 parts of gaseous chlorine is introduced into the solution at 0° to 10° C. After about 150 parts of chlorine has been fed in, 40 parts of water is added in portions until the end of the reaction. The excess chlorine present in the reaction solution is expelled with nitrogen, the solution is dried over sodium sulfate and the 1,2-dichloroethane is distilled off. Vacuum distillation is then carried out. 308 parts of β-chloroethane sulfochloride (94% of the theory) is obtained having a boiling point of 80° C. at 1 to 2 mm. and a refractive index $n_D^{20}=1.4924$.

EXAMPLE 2

166 parts of β-hydroxyethylmercaptan (technical, 95%) is placed in a stirred vessel and 470 parts of chlorine is passed in at 0° to 5° C. When 200 parts of chlorine has been passed in, a start is made in metering in 38 parts of water. After the reaction is over, excess chlorine is expelled by passing in nitrogen. 328 parts of β-chloroethyl sulfochloride (yield about 96% of the theory) is obtained as a colorless oily liquid. The β-chloroethyl sulfochloride thus obtained may be used without further purification.

I claim:
1. A process for the production of β-chloroethyl, β-chloropropyl, β-bromoethyl or β-bromopropyl sulfochloride or sulfobromide which comprises reacting a β-hydroxyethylmercaptan or a β - hydroxypropylmercaptan with chlorine or bromine in a molar ratio of 1:3 to 1:6 in the presence of 1 to 1.1 moles of water per mole of β-hydroxyalkylmercaptan at a temperature of −15° C. to +50° C.
2. A process as claimed in claim 1 wherein 3 to 4 moles of chlorine or bromine is used per mol of β-hydroxyalkylmercaptan.
3. A process as claimed in claim 1 wherein water is added at intervals during the reaction.
4. A process as claimed in claim 1 wherein water is added during the reaction at the rate at which it is consumed in the reaction.
5. A process as claimed in claim 1 carried out at a temperature of 0° to 25° C.
6. A process as claimed in claim 1 carried out in the presence of a hydrocarbon or a chlorohydrocarbon having a boiling point of from 30° to 200° C. and which is inert under the reaction conditions, as solvent.

References Cited

UNITED STATES PATENTS 3,248,423   4/1966   Stratton _____ 260—543

OTHER REFERENCES

Morrison & Boyd: Organic Chemistry (1959) Allyn & Bacon, Inc., p. 337.

LORRAINE A. WEINBERGER, Primary Examiner

E. J. GLEIMAN, Assistant Examiner

PO-1050
(5/69)

UNITED STATES PATENT OFFICE
CERTIFICATE OF CORRECTION

Patent No. 3,564,053      Dated February 16, 1971

Inventor(s) Harry Distler

It is certified that error appears in the above-identified patent and that said Letters Patent are hereby corrected as shown below:

Column 1, line 4, "at temperatures of -15° C. to +50° C." should read -- with chlorine or bromine in the molar --.

Signed and sealed this 15th day of June 1971.

(SEAL)
Attest:

EDWARD M. FLETCHER, JR.      WILLIAM E. SCHUYLER, JR.
Attesting Officer      Commissioner of Patents